United States Patent
Howard et al.

(10) Patent No.: US 6,626,720 B1
(45) Date of Patent: Sep. 30, 2003

(54) METHOD OF MANUFACTURING VACUUM GAP DIELECTRIC FIELD EMISSION TRIODE AND APPARATUS

(75) Inventors: Emmett M. Howard, Gilbert, AZ (US); Curtis D. Moyer, Phoenix, AZ (US); Joseph Justin Bonanno, Gilbert, AZ (US); Robert H. Reuss, Fountain Hills, AZ (US)

(73) Assignee: Motorola, Inc., Schaumburg, IL (US)

(*) Notice: Subject to any disclaimer, the term of this patent is extended or adjusted under 35 U.S.C. 154(b) by 331 days.

(21) Appl. No.: 09/656,912

(22) Filed: Sep. 7, 2000

(51) Int. Cl.[7] .................................................. H01J 9/02
(52) U.S. Cl. .................................... 445/24; 313/309
(58) Field of Search .............................. 445/24; 313/309

(56) References Cited

U.S. PATENT DOCUMENTS

| | | | |
|---|---|---|---|
| 5,181,874 A | * 1/1993 | Sokolich et al. | 445/24 |
| 5,681,196 A | 10/1997 | Jin | |
| 5,818,153 A | * 10/1998 | Allen | 445/24 |
| 5,872,422 A | * 2/1999 | Xu et al. | 313/309 |
| 6,137,213 A | * 10/2000 | Moyer et al. | 313/309 |
| 6,283,812 B1 | * 9/2001 | Jin et al. | 445/24 |

FOREIGN PATENT DOCUMENTS

| | | |
|---|---|---|
| EP | 0 525 763 A | 2/1993 |
| EP | 1 022 763 A | 7/2000 |

OTHER PUBLICATIONS

Hong D. et al., Poly–Diamond Gated Field–Emitter Display Cells, IEEE Transactions On Electron Devices, IEEE Inc., New York, US, vol. 46, No. 4, pp. 787–791, XP000906409, Apr. 1999.

* cited by examiner

Primary Examiner—Kenneth J. Ramsey
(74) Attorney, Agent, or Firm—William E. Koch (57) ABSTRACT

A vacuum gap dielectric field emission triode and a method of fabrication include a conductive layer positioned on a supporting substrate and an emitter positioned on the conductive layer. A gate metal layer electrically separated from the conductive layer defines a metal bridge gate surrounding the emitter and separated from the emitter by a substantially fixed distance. The gate metal layer defines a gate opening through the metal bridge gate overlying the emitter. An anode is positioned in spaced relationship to the gate metal layer and the triode is sealed in a substantial vacuum so that the emitter is separated from the metal bridge by the substantial vacuum and the metal bridge is separated from the anode by the substantial vacuum.

39 Claims, 4 Drawing Sheets

*FIG. 12*

METHOD OF MANUFACTURING VACUUM GAP DIELECTRIC FIELD EMISSION TRIODE AND APPARATUS

FIELD OF THE INVENTION

This invention relates to low capacitance field emission triodes and to a method for fabricating such triodes.

BACKGROUND OF THE INVENTION

Field emission devices (FEDs) have been known for many years. However, FEDs typically use a structure Commonly known as a Spindt tip for the emitter. However, Spindt tips require a very small feature size in triodes to provide the desired emission and control of the emitted electrons. This very small site is very difficult to achieve and can result in serious damage to the tip during high current emission or if it is not uniformly constructed.

Also, the gate in prior field emission triodes is generally fabricated by surrounding the Spindt tip with a dielectric material and then depositing a metal layer on the dielectric material. An opening is etched through the metal layer to define an edge of the metal layer equa-instant from the extreme tip of the Spindt tip. Some of The dielectric is then removed to form a well surrounding the Spindt tip. The centering of the edge around the extreme tip and the distance of the edge from the extreme tip is critical to the operation and draws electrons from the Spindt tip toward an anode disposed remotely beyond the metal layer. In addition to the problem of centering the edge around the tip at the correct distance, one problem that occurs from this arrangement is that the electrons have a tendency to disperse rather widely and must be focused in some fashion into the desired spot size at the anode. Another problem that occurs in Spindt tips is the need to provide a ballast resistor with each tip. Ballast resistors are relatively difficult to incorporate into an array of Spindt tips and require additional process steps.

In this prior art structure, the metal layer and the dielectric layer combine to form a relatively high capacitance. Further, the gate to emitter separation is very close, which results in additional capacitance. These capacitances combine in an array of Spindt tips to produce an overall capacitance for the device which becomes a serious problem when using high speed or high frequency signals in the displays.

Accordingly, it is highly desirable to provide a device which overcomes these problems and a method of fabricating the device.

BRIEF DESCRIPTION OF THE DRAWINGS

Referring to the drawings.

DESCRIPTION OF THE PREFERRED EMBODIMENT

Figure 1:
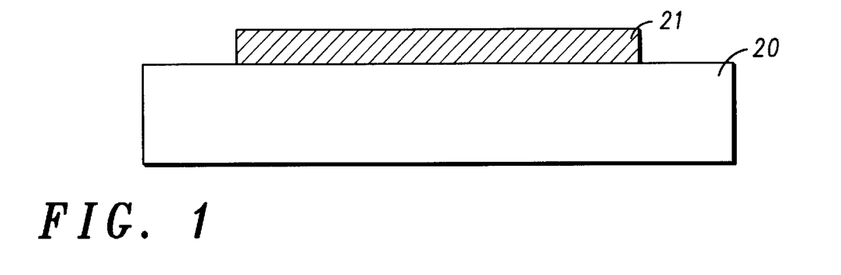
FIG. 1 is a sectional view illustrating first steps in a fabrication process for a vacuum gap dielectric field emission triode in accordance with the present invention.
Figure 2:
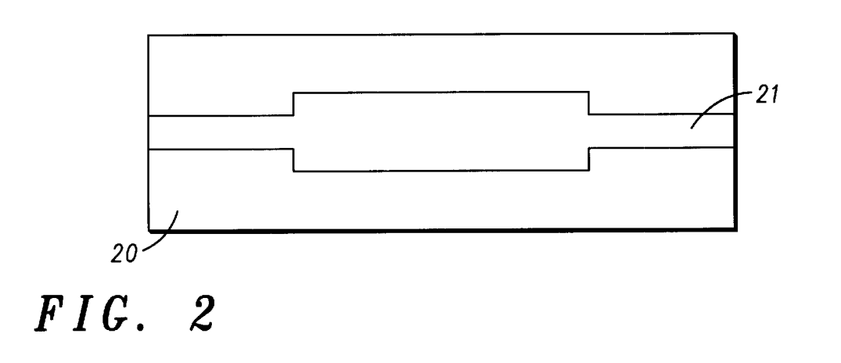
FIG. 2 is a view in top plan illustrating the first steps in the fabrication process illustrated in FIG. 1.

Turning now to the figures and specifically to FIGS. 1 and 2, a supporting substrate 20 is provided, which is preferably a non-conductive material such as glass or ceramic. While substrate 20 could be a semiconductor material, so as to integrate some control electronics into a display of vacuum gap dielectric field emission triodes, some insulating layers would be included to reduce any capacitance between the substrate and the display.

A conductive layer 21 is then deposited on the surface of substrate 20 to form a base for an emitter. As can be seen best in FIG. 2, conductive layer 21 is formed into an elongated strip with an expanded portion defining the emitter area. The elongated strip provides external electrical connections to the emitter, as will be described in more detail presently. Also, when the vacuum gap dielectric field emission triode is being fabricated in an array, a plurality of strips are formed in parallel spaced apart relationship (generally referred to as rows) and each strip has a plurality of expanded portions formed therein. Generally conductive layer 21 includes a metal, such as titanium, titanium tungsten, chromium, or the like, that will adhere well to substrate 20 and on which one or more emitters can be conveniently mounted.

Figure 3:
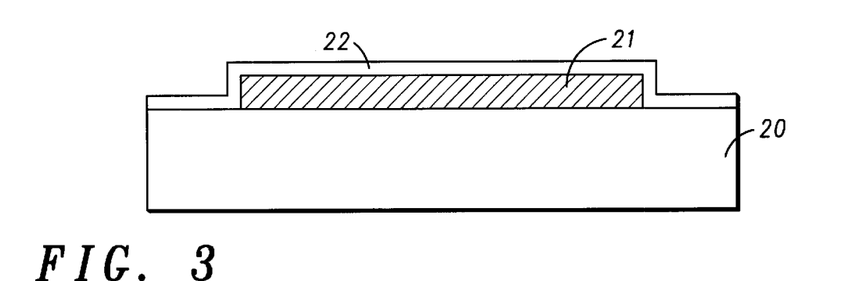
FIG. 3 is a sectional view similar to FIG. 1 illustrating an additional and optional step in the fabrication process for a vacuum gap dielectric field emission triode in accordance with the present invention.

Referring additionally to FIG. 3, a bleed layer 22 is optionally deposited over conductive layer 21 and extends outwardly on the surface of substrate 20 beyond layer 21 and into contact with a metal gate to be explained presently. Bleed layer 22 is formed of a thin relatively high resistance material (e.g., approximately $10^{11}$ ohms/square), such as tantalum nitride (TaN), chromium oxy-nitride ($CrO_xN_y$) or the like to allow charge accumulated during operation to bleed off so as to not produce an undesirable surface potential. Additional information on bleed layers can be found in U.S Pat. No. 5,760,535, entitled "Field Emission Device", issued Jun. 2, 1998, and incorporated herein by reference. Because bleed layer 22 is made very thin, it does not noticeably affect the flow of current from conductive layer 21 laterally therethrough. However, very little current flows longitudinally between the emitter and the gate because bleed layer 22 is a relatively poor conductor. When present, bleed layer 22 is considered to be a portion or sublayer of conductive layer 21 for convenience in understanding the present disclosure. Thus, for example, when an emitter is positioned on conductive layer 21, bleed layer 22 may or may not be present.

Figure 4:
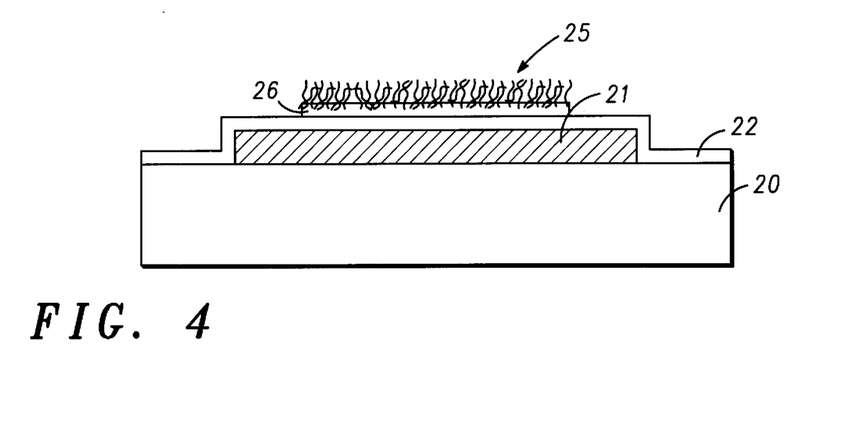
FIG. 4 is a sectional view illustrating additional steps in the fabrication process for a vacuum gap dielectric field emission triode in accordance with the present invention.
Figure 5:
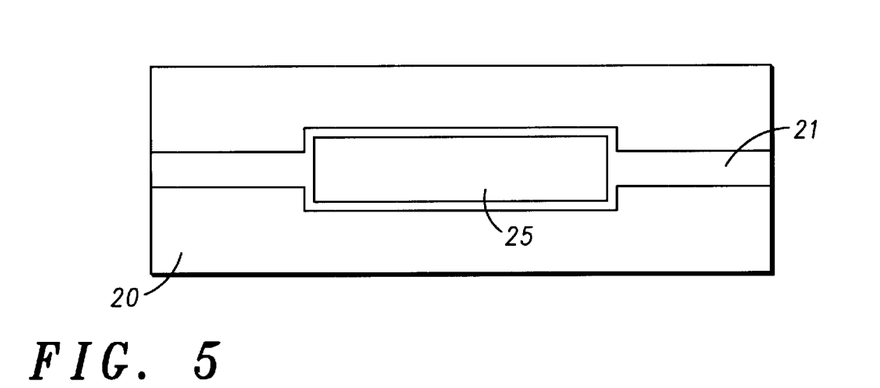
FIG. 5 is a view in top plan illustrating the additional steps in the fabrication process illustrated in FIG. 4.

Turning now to FIGS. 4 and 5, an emitter 25 is positioned on conductive layer 21 and generally in a centrally located portion of the upper surface of the expanded area (as can best be seen in FIG. 5). In this preferred embodiment, emitter 25 includes a plurality of high aspect ratio members, such as nanotubes, carbon fibers, nanocoralline, crushed graphite, metallic threads, metal-insulator-metal, or the like. Because of the high aspect ratio members and the materials used, the emitter is self-biasing and the additional steps required in the prior art for providing ballast resistors and the like are not needed. Additional information on nanocoralline material is available in U.S. Pat. No. 6,087,765, entitled "Electron Emissive Film", issued Jul. 11, 2000, and incorporated herein by reference. In this context, the "aspect ratio" is defined as the ratio of the length of each member to its diameter or width. The plurality of high aspect ratio members generally have an aspect ratio in a range of approximately 5000 Å to 100,000 Å length and 10 Å to 1000 Å diameter, with a nominal aspect ratio of approximately 20,000 Å length to 10–100 Å diameter. A range is used for the diameter, in the nominal aspect ratio, because of the difficulty in controlling the diameter to a precise number. Because nanotubes are well known in the field and to simplify this disclosure, the high aspect ratio members will hereinafter be referred to generally as nanotubes.

In the step of positioning the nanotubes on conductive layer 21 a variety of processes may be incorporated to insure that a major portion of the nanotubes extend vertically from conductive layer 21. In one preferred process, the nanotubes are adhered to the surface of conductive layer 21 with a conductive binder 26 having, for example, approximately 4 Mohms/square resistance. Further, the binder incorporates irregularly shaped material to preferentially orient the nanotubes vertically or perpendicular to conductive layer 21. A surfactant may be used during the positioning process to prevent the nanotubes from clumping together. Also, a hydrophobic coating on the nanotubes will help to maintain the desired orientation. Various methods to apply and pattern the nanotubes include dry spraying, wet spraying, growing by means of CVD and using a seed material, electro deposition, electro phoretics, etc. In yet another method, the nanotubes can be grown or deposited as a final process step (but prior to providing an anode and vacuum sealing the structure). It will be understood by those skilled in the nanotube art, that some manipulation or activation of the nanotubes may be performed subsequent to the application to achieve desired nanotube position. All application and manipulation steps performed in this process are intended to be included in the term "positioning" used herein.

Here it should be noted that the nanotubes may vary somewhat in length and the longest nanotubes or the nanotubes extending the closest to an anode (to be discussed) will carry the most current. If the current carried is excessive there generally is some damage to the end of the nanotube, thereby shortening the nanotube. Thus, if the lengths of the nanotubes vary excessively, a short burn-in period could be used to bring the lengths of the nanotubes into conformance so that all or most of the nanotubes conduct substantially equally. Additional information on this burn-in process can be obtained from a copending U.S. Patent Application, attorney docket number FD99-020, filed Jun. 7, 2000, entitled "Method of Improving Uniformity of Emission Current of Field Emission Devices", incorporated herein by reference. Also, in a vacuum environment, there is a tendency for a small amount of water to accumulate around each nanotube. This water accumulation, reduces the work function of the nanotubes so that they emit electrons at a lower voltage, hence increasing the emitted current at a standard operating voltage. If the current becomes too high, the water is driven off, which increases the work function of the nanotubes so that they emit fewer electrons and the current is reduced.

Figure 6:
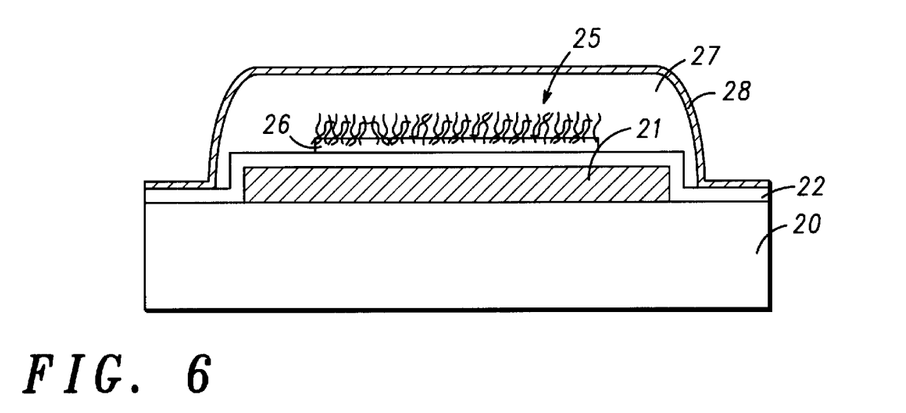
FIGS. 6, 7, and 8 are sectional views illustrating additional steps in the fabrication process for a vacuum gap dielectric field emission triode in accordance with the present invention.

Turning now to FIG. 6, in this preferred embodiment, a sacrificial layer 27 is deposited so as to surround emitter 25. Sacrificial layer 27 is formed with a depth and width that defines a gate separation from emitter 25, as will be explained in more detail. Sacrificial layer 27 is preferably formed of photo-resist because of its ease in removal but could be Spin-On-Glass (SOG), polyimide (PI), Q-pac, etc. Whatever material is used for sacrificial layer 27, it should be understood that the deposition, patterning, etching or otherwise removing, and cleaning should not remove or irreversibly harm the nanotube's emissive characteristics. If photo-resist is used an optional reflow step may be incorporated to provide better step coverage.

With sacrificial layer 27 completed and rounded as shown, a thin gate seed material 28 is deposited on the surface. Generally, seed material 28 is deposited by any convenient process, such as evaporation, ceramic printing, or the like, to produce a layer in a range of approximately 0.5 $\mu$m to 2 $\mu$m. Seed material 28 can include titanium, titanium/tungsten, or chromium to adhere to sacrificial layer 27 and some copper to improve electrical conduction for subsequent electroplating. By forming sacrificial layer 27 with generally rounded corners, as illustrated, seed material 28 can be evaporated onto the surface with a better uniformity throughout the surface. If the sides of sacrificial layer 27 are too steep breaks in seed material 28 can form and later plating steps will not form a uniform layer.

Figure 7:
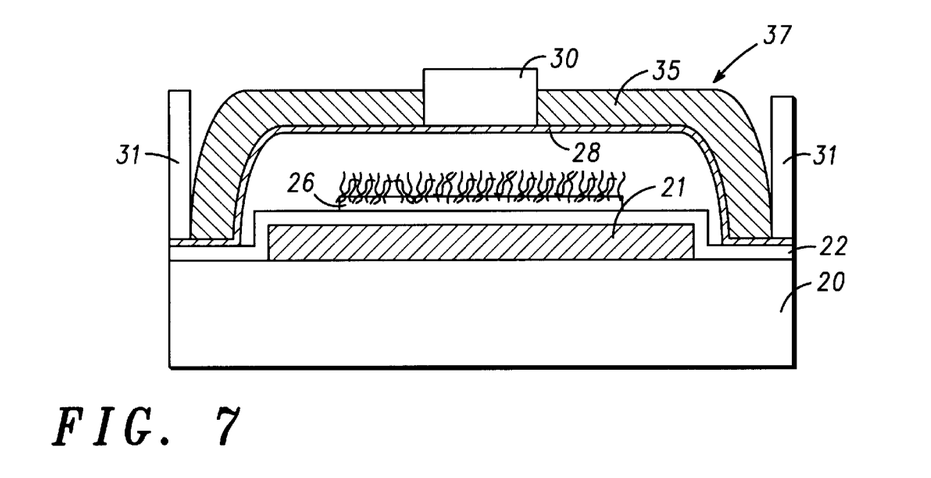

Referring additionally to FIG. 7, a mask is formed on seed material 28 to define a gate opening 30 and gate edges 31. In this preferred embodiment, a layer of photoresist is applied across the entire structure and then patterned and removed to leave only a portion defining gate opening 30 and the gate edges 31. It will of course be understood that other mask materials may be used, such as oxides, nitrides and the like.

With the mask in place, a relatively thick layer 35 of material is plated onto the exposed surface of seed material 28. In this preferred embodiment, layer 35 includes copper which is a good conductor and can be easily electroplated. The copper is electroplated to form a bridge or dome shape over the structure with a thickness in a range of approximately 5 $\mu$m to 15 $\mu$m. The copper of layer 35 combines with seed material 28 to form a continuous bridge 37. It will be understood, however, that other deposition methods, such as vacuum deposition, thermal spray, etc. could be used if desired. Also, other conductive materials or metals could be used which are more adapted to the deposition method used.

When the vacuum gap dielectric field emission triode is being fabricated in an array, the photoresist defining gate edges 31 separates the electroplated copper into a plurality of strips formed in parallel spaced apart relationship (generally referred to as columns) and generally perpendicular to the strips formed in conductive layer 21. In this preferred embodiment, both the strips formed in conductive layer 21 and the strips of electroplated copper (gates) are separated by approximately 10 $\mu$m or more. This separation reduces row to column capacitance, reduces probability of shorting and leakage paths between conductors, and provides a vacuum dielectric which will not degrade from electron bombardment.

Figure 8:
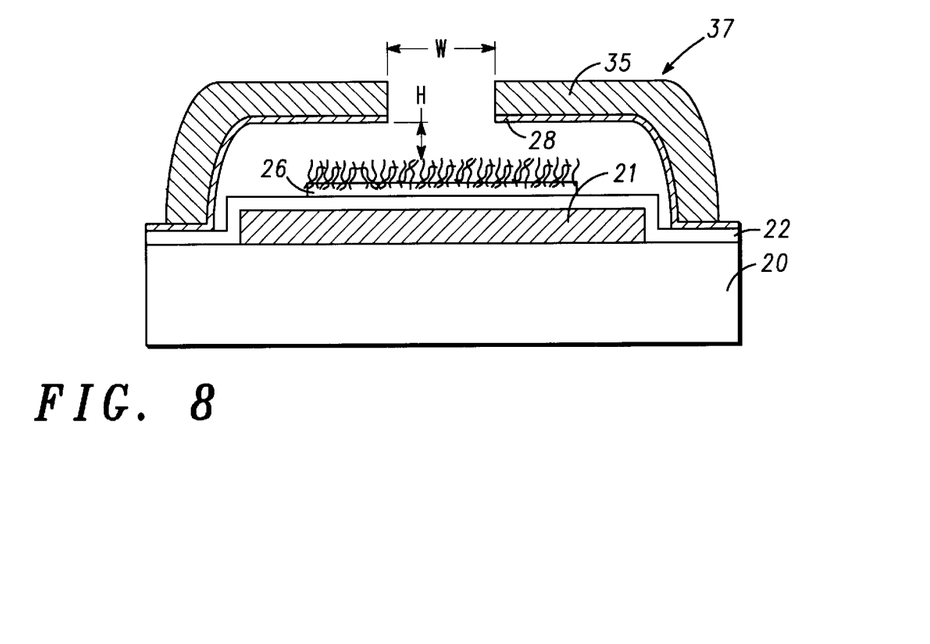
Figure 9:
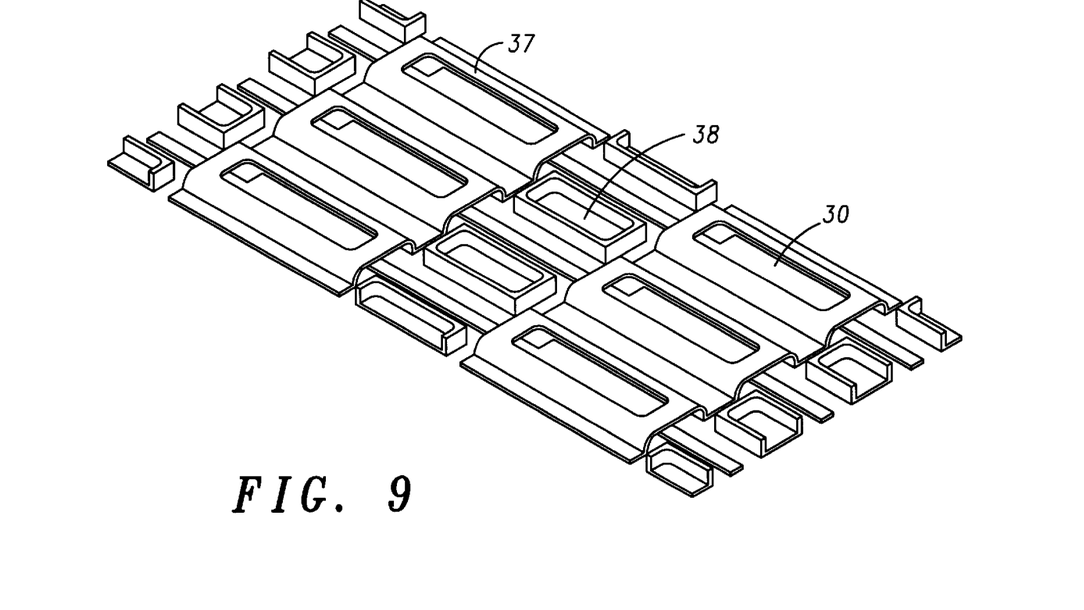
FIG. 9 is a top isometric view illustrating an array of the portion of the vacuum gap dielectric field emission triodes completed in FIG. 8.
Figure 10:
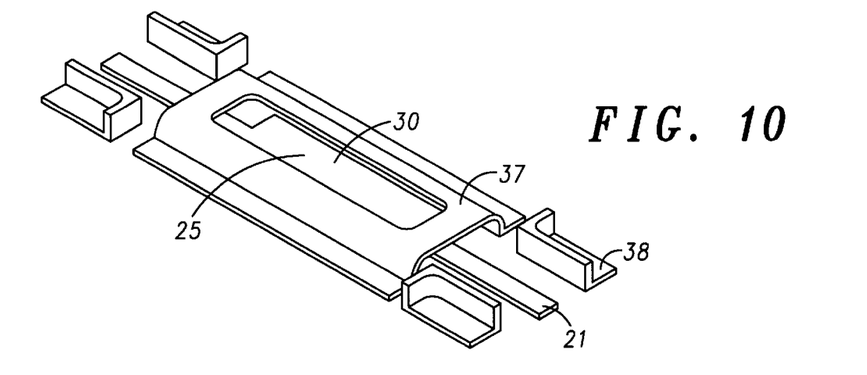
FIG. 10 is an isometric view of the portion of the vacuum gap dielectric field emission triode completed in FIG. 8.

Once the deposition of layer 35 is completed, the mask is removed and seed material 28 is etched to form gate opening 30 completely through bridge 37. Here it will be understood that seed material 28 can be a material that differs from layer 35 (e.g., titanium and copper, respectively) so that it can be selectively etched or a portion of layer 35 may be allowed to etch. Also, any portions of seed material 28 which are present between adjacent strips are removed so that adjacent strips are electrically separated. Sacrificial layer 27 is then removed, as illustrated in FIG. 8 to leave bridge 37 suspended over emitter 25. As described briefly above, the nanotubes could be mounted on conductive layer 21 at this point, if convenient and not previously done. A top isometric view of the array and an isometric view of a portion of an array of gates and emitters is illustrated in FIGS. 9 and 10, respectively. In these illustrations spacer mounting pads 38 are formed between adjacent rows of bridges 37 to aid in keeping an anode at a fixed distance from bridges 37.

Here it should be understood by those skilled in the art that the above described method of selective deposition is preferred because of its simplicity and accuracy. However, in some applications a blanket layer of metal can be deposited on the entire structure with the portions between adjacent strips and/or bridges 37 and gate openings 30 removed using a well known lift-off process. The blanket deposition and lift-off process may eliminate the deposition of seed material 28, if desired.

As stated above, sacrificial layer 27 is formed with a depth and width that defines a gate separation from emitter 25. While some scaling is possible (e.g., changes in anode operating potential may include changes in emitter-gate spacing, etc.), in this preferred embodiment, layer or bridge 37 is formed with a height, H, which is substantially a constant separation of bridge 37 from emitter 25 and a gate opening width, W. In a specific example, H can be approximately 12 $\mu$m and W can be approximately 20 $\mu$m. Generally, it has been found that the thickness (approximately 10 $\mu$m in the above example) and height H of bridge 37 and width W of the gate opening are related to device performance and preferably are kept proportional. Also, in regard to height H, a vacuum space from emitter 25 or substrate 20 is established that provides the best dielectric strength by way of a vacuum gap.

Figure 11:
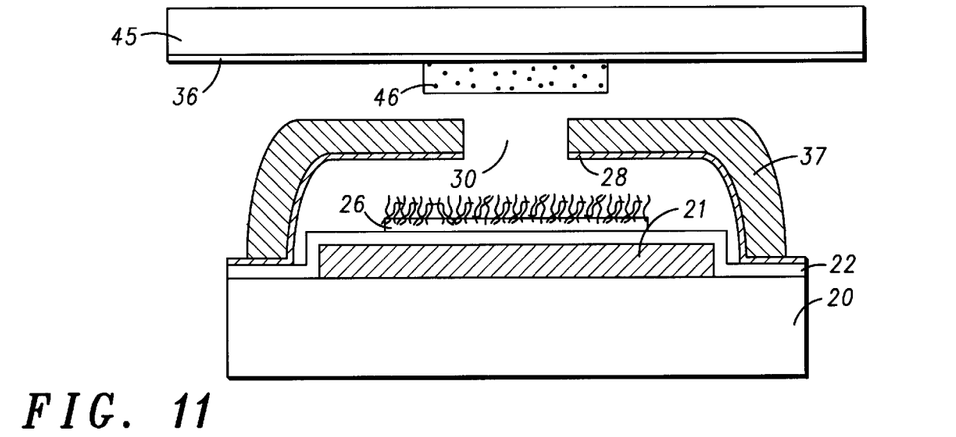
FIG. 11 is a sectional view illustrating additional steps in the fabrication process for a vacuum gap dielectric field emission triode in accordance with the present invention.

Finally, an anode 45 is disposed in spaced relation from bridge or bridges 37, as illustrated in FIG. 11. Anode 45 is, for example a glass plate with transparent conductive layer 36 and with phosphor dots 46 formed thereon in alignment with each gate opening 30 in bridges 37. In this preferred embodiment anode 45 is spaced approximately 250 $\mu$m to 1200 $\mu$m from substrate 20. Substrate 20 and anode 45 are sealed around the edges and a vacuum of $10^{-6}$ tor or less is produced during sealing.

Figure 12:
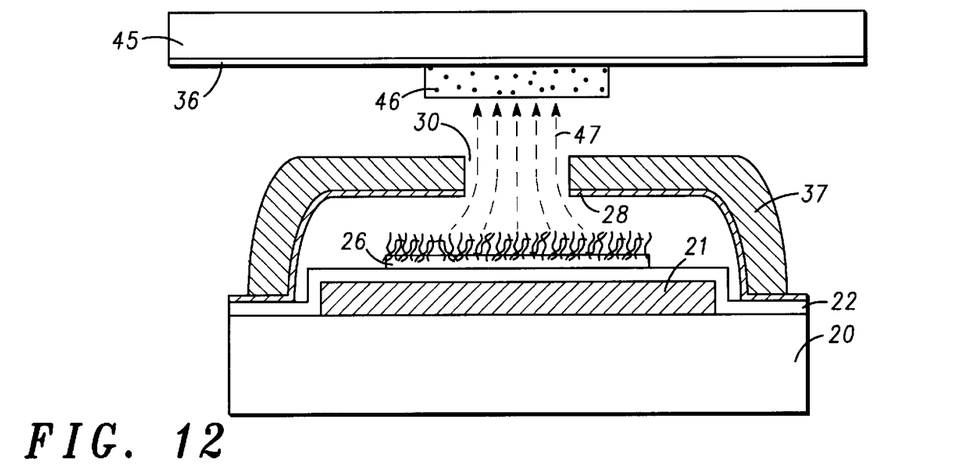
FIG. 12 is a schematic view of a complete vacuum gap dielectric field emission triode, illustrating some operating characteristics.

Referring additionally to FIG. 12, a schematic view of a complete vacuum gap dielectric field emission triode is illustrated. In this embodiment, a potential of approximately 6 kV is applied to anode 45. The bridge 37 (gate) has two operating modes or potentials. In a first mode the potential is low enough to prevent a flow of electrons from emitter 25 to anode 45. In a second mode the potential is increased so that electrons flow from emitter 25 to anode 45 but there is a mild field retardation in gate opening 30 which produces a small amount of focusing. In effect, the gate potential in the second mode produces alignment of electron extraction electric field lines, designated 47. Since electrons are generally emitted from emitter 25 perpendicular to layer 21, only a small amount of focusing can be used to correct for any stray electrons or any spreading of the beam.

Thus, a method of fabricating a vacuum gap dielectric field emission triode or arrays of vacuum gap dielectric field emission triodes is disclosed which greatly simplifies the manufacturing process. In the preferred device the gate to emitter or cathode separation is increased to approximately 12 $\mu$m from less than or equal to 1 $\mu$m for prior art devices, reducing capacitance of the triode. The gate opening is increased in size to approximately 20 $\mu$m from less than or equal to 1 $\mu$m for prior art devices, reducing defect sensitivity. Elimination of the deposited cathode and gate interlayer dielectric used in prior art devices further reduces capacitance. Improved electron trajectory or focusing is obtained through alignment of the electron extraction electric field lines. Also, because of the vacuum gap structure, failure of the dielectric and, hence, the entire device, is less likely. Further, because of the type of emitter used, self ballasting occurs and additional components, such as ballast resistors and the like, are not required.

Other advantages include thick film processing of the bridge to create a gate which is tolerant of larger defect sizes and allows the deposition of high aspect ratio emitter material. Spindt type triodes require a small feature size to create the tip, where the present method allows the use of a harvested emitter material which is deposited without the need for a defining well or which can be grown.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A method of fabricating a vacuum gap dielectric field emission triode comprising the steps of:
   providing a supporting substrate;
   depositing a layer of conductive material on the supporting substrate;
   positioning an emitter on the layer of conductive material;
   forming a sacrificial layer of material surrounding the emitter, the sacrificial layer having a depth and width that defines a gate separation from the emitter;
   forming a gate seed layer on the sacrificial layer;
   forming a mask on the gate seed layer, the mask defining a gate opening and gate edges;
   depositing a gate metal layer on the gate seed layer using the mask, the gate metal layer and the seed layer combining to form a gate;
   removing the mask;
   etching an opening through the gate seed layer using the gate metal layer as a mask;
   removing the sacrificial layer surrounding the emitter; and
   positioning an anode in spaced relationship to the gate metal layer.

2. A method of fabricating a vacuum gap dielectric field emission triode as claimed in claim 1 wherein the step of depositing the layer of conductive material includes depositing material that adheres to the supporting substrate.

3. A method of fabricating a vacuum gap dielectric field emission triode as claimed in claim 1 wherein the step of forming the gate seed layer includes vacuum depositing a thin layer of metal.

4. A method of fabricating a vacuum cap dielectric field emission triode as claimed in claim 1 wherein the step of depositing the layer of conductive material includes depositing a material including one of titanium, tungsten, and chromium.

5. A method of fabricating a vacuum gap dielectric field emission triode as claimed in claim 4 wherein the step of depositing the gate metal layer includes depositing a metal including one of copper, nickel, and gold.

6. A method of fabricating a vacuum gap dielectric field emission triode as claimed in claim 5 wherein the step of depositing the bleed layer includes depositing a layer of including one of TaN and $CrO_xN_y$.

7. A method of fabricating a vacuum gap dielectric field emission triode as claimed in claim 1 wherein the step of depositing the gate metal layer includes plating a gate metal using the seed layer as a conductor.

8. A method of fabricating a vacuum gap dielectric field emission triode an claimed in claim 1 wherein the step of depositing the layer of conductive material includes depositing a bleed layer overlying the layer of conductive material and extending into contact with the gate metal layer.

9. A method of fabricating a vacuum gap dielectric field emission triode as claimed in claim 1 wherein the step of positioning the emitter on the layer of conductive material includes positioning a plurality of high aspect ratio members.

10. A method of fabricating a vacuum gap dielectric field emission triode as claimed in claim 9 wherein the step of positioning the plurality of high aspect ratio members includes positioning members with an aspect ratio in a range of approximately 5000 Å to 100,000 Å length and 10 Å to 1000 Å width.

11. A method of fabricating a vacuum gap dielectric field emission triode an claimed in claim 9 wherein the step of positioning the plurality of high aspect ratio members includes positioning one of nanotubes, carbon fibers, nanocoralline, crushed graphite, and metallic threads.

12. A method of fabricating a vacuum gap dielectric field emission triode as claimed in claim 9 wherein the step of positioning the plurality of high aspect ratio members includes adhering the high aspect ratio members to the layer of conductive material using a conductive binder.

13. A method of fabricating a vacuum gap dielectric field emission triode as claimed in claim 9 wherein the step of positioning the plurality of high aspect ratio members includes one of dry spraying, wet spraying, growing by means of CVD and using a seed material, electro phoretics, and electro deposition.

14. A method of fabricating a vacuum gap dielectric field emission triode as claimed in claim 1 wherein the step of forming the sacrificial layer includes depositing a layer including one of photo-resist and an oxide.

15. A method of fabricating a vacuum gap dielectric field emission triode as claimed in claim 1 wherein the step of forming the mask on the gate seed layer includes depositing a sacrificial layer including one of photo-resist and an oxide and removing portions of the sacrificial layer surrounding the gate opening and the gate edges.

16. A method of fabricating a vacuum gap dielectric field emission triode as claimed in claim 1 wherein tho atop of forming the sacrificial layer having the depth and width that defines the gate separation from the emitter includes defining a separation of the gate from the emitter by a distance in a range of 1 µm to 30 µm.

17. A method of fabricating a vacuum gap dielectric field emission triode as claimed in claim 1 wherein the step of forming the mask defining the gate opening includes defining a gate opening in a range of 1 µm to 60 µm.

18. A method of fabricating a vacuum gap dielectric field emission triode as claimed in claim 1 including in addition a step of sealing the triode in a substantial vacuum so that the emitter is separated from the gate by the substantial vacuum and the gate is separated from the anode by the substantial vacuum.

19. A method of fabricating an array of vacuum gap dielectric field emission triodes comprising the steps of:

providing a supporting substrate;

depositing a plurality of parallel spaced apart emitter strips of conductive material on the supporting substrate;

positioning a plurality of emitters on the emitter strips of conductive material;

forming a sacrificial layer of material surrounding each of the emitters, the sacrificial layer having a depth and width that defines a gate separation from each of the emitters;

forming a blanket gate seed layer on the sacrificial layer;

forming a mask on the gate seed layer, the mask defining gate openings overlying each of the plurality of emitters, the mask further defining gate edges defining parallel spaced apart gate strips perpendicular to the emitter strips;

depositing a gate metal layer on the gate seed layer using the mask, the gate metal layer and the seed layer combining to form a gate associated with each of the plurality of emitters;

removing the mask;

etching an opening through the gate seed layer using the gate metal layer as a mask and etching the gate seed layer between the gate strips to electrically separate the gate strips;

removing the sacrificial layer surrounding the emitters; and positioning an anode in spaced relationship to the gate metal layer.

20. A method of fabrication an array of vacuum gap dielectric field emission triodes as claimed in claim 19 wherein the step of depositing the layer of conductive material includes depositing material that adheres to the supporting substrate.

21. A method of fabricating an array of vacuum gap dielectric field emission triodes as claimed in claim 19 wherein the step of forming the gate seed layer includes vacuum depositing a thin layer of metal.

22. A method of fabricating an array of vacuum gap dielectric field emission triodes as claimed in claim 19 wherein the step of depositing the layer of conductive material includes depositing a material including one of titanium, tungsten, and chromium.

23. A method of fabricating an array of vacuum gap dielectric field emission triodes as claimed in claim 22 wherein the step of depositing the gate metal layer includes depositing a metal including one of copper, nickel, and gold.

24. A method of fabricating an array of vacuum gap dielectric field emission triodes as claimed in claim 19 wherein the step of depositing the gate metal layer includes plating a gate metal using the seed layer as a conductor.

25. A method of fabricating an array of vacuum gap dielectric field emission triodes as claimed in claim 19 wherein the step of depositing the layer of conductive material includes depositing a bleed layer overlying the layer of conductive material and extending into contact with the gate metal layer.

26. A method of fabricating an array of vacuum gap dielectric field emission triodes as claimed in claim 25 wherein the step of depositing the bleed layer includes depositing a layer including one of TaN and $CrO_xN_y$.

27. A method of fabricating an array of vacuum gap dielectric field emission triodes as claimed in claim 19 wherein the step of positioning the emitters on the layer of conductive material includes positioning a plurality of high aspect ratio members for each emitter.

28. A method of fabricating an array of vacuum gap dielectric field emission triodes as claimed in claim 27 wherein the step of positioning the plurality of high aspect ratio members includes positioning members with an aspect ratio in a range of approximately 5000 Å to 100,000 Å length and 10 Å to 1000 Å width.

29. A method of fabricating an array of vacuum gap dielectric field emission triodes as claimed in claim 27 wherein the step of positioning the plurality of high aspect ratio members includes positioning one of nanotubes, carbon fibers, nanocoralline, crushed graphite, and metallic threads.

30. A method of fabricating an array of vacuum gap dielectric field emission triodes as claimed in claim 27 wherein the step of positioning the plurality of high aspect ratio members includes adhering the high aspect ratio members to the layer of conductive material using a conductive binder.

31. A method of fabricating a vacuum gap dielectric field emission triode as claimed in claim 27 wherein the step of positioning the plurality of high aspect ratio members includes one of dry spraying, wet spraying, growing by means of CVD and using a mood material, electro phoretics, and electro deposition.

32. A method of fabricating an array of vacuum gap dielectric field emission triodes as claimed in claim 19 wherein the step of forming the sacrificial layer includes depositing a layer including one of photo-resist and an oxide.

33. A method of fabricating an array of vacuum gap dielectric field emission triodes as claimed in claim 19 wherein the step of forming the mask on the gate seed layer includes depositing a sacrificial layer including one of photo-resist and an oxide and removing portions of the sacrificial layer surrounding each of the gate openings and the gate edges.

34. A method of fabricating an array of vacuum gap dielectric field emission triodes as claimed in claim 19 wherein the step of forming the sacrificial layer having the depth and width that defines the gate separation from the emitter includes defining a separation of each of the gates from the associated emitter by a distance in a range of 1 $\mu$m to 30 $\mu$m.

35. A method of fabricating an array of vacuum gap dielectric field emission triodes as claimed in claim 19 wherein the step of forming the mask defining the gate openings includes defining each of the gate openings in a range of 1 $\mu$m to 60 $\mu$m.

36. A method of fabricating an array of vacuum gap dielectric field emission triodes as claimed in claim 19 including in addition a step of sealing the array in a substantial vacuum so that each of the emitters is separated from the associated gate by the substantial vacuum and the gates are separated from the anode by the substantial vacuum.

37. A method of fabricating a vacuum gap dielectric field emission triode comprising the steps of:

providing a supporting substrate;

depositing a layer of conductive material on the supporting substrate;

positioning an emitter on the layer of conductive material;

forming a sacrificial layer of material having a depth and width that defines a gate separation from the emitter;

depositing gate metal on the sacrificial layer, the gate metal defining a gate opening spaced from the emitter;

removing the sacrificial layer to provide a gate metal bridge spaced from the emitter with the gate opening therethrough; and positioning an emitter on the layer of conductive material after the sacrificial layer has been removed; and positioning an anode in spaced relationship to the gate metal bridge.

38. A method of fabricating a vacuum gap dielectric field emission triode comprising the steps of:

providing a supporting substrate;

depositing a layer of conductive material on the supporting substrate;

positioning an emitter on the layer of conductive material;

forming a sacrificial layer of material having a depth and width that defines a gate separation from the emitter;

depositing gate metal on the sacrificial layer, including:
  forming a gate seed layer on the sacrificial layer;
  forming a mask on the gate seed layer, the mask defining a gate opening and gate edges;
  depositing a gate metal layer on the gate seed layer using the mask, the gate metal layer and the seed layer combining to form a gate;
  removing the mask; and
  etching an opening through the gate seed layer using the gate metal layer as a mask;

removing the sacrificial layer to provide a gate metal bridge spaced from the emitter with the gate opening therethrough; and positioning an anode in spaced relationship to the gate metal bridge.

39. A Method of fabricating a vacuum gap dielectric field emission triode comprising the steps of:

providing a supporting substrate;

depositing a laser of conductive material on the supporting substrate;

positioning an emitter on the layer of conductive material;

forming a sacrificial layer of material having a depth and width that defines a gate separation from the emitter;

depositing gate metal on the sacrificial layer, the gate metal defining a gate opening spaced from the emitter, the step of depositing gate metal includes depositing a blanket layer of gate metal and performing a lift-off to define the gate opening;

removing the sacrificial layer to provide a gate metal bridge spaced from the emitter with the gate opening therethrough; and positioning an anode in spaced relationship to the gate metal bridge.

* * * * *

UNITED STATES PATENT AND TRADEMARK OFFICE
CERTIFICATE OF CORRECTION

PATENT NO. : 6,626,720 B1
DATED : September 30, 2003
INVENTOR(S) : Howard et al.

It is certified that error appears in the above-identified patent and that said Letters Patent is hereby corrected as shown below:

<u>Column 9,</u>
Line 13, delete "mood" and insert -- seed --.

<u>Column 10,</u>
Line 37, delete "laser" and insert -- layer --.

Signed and Sealed this

First Day of June, 2004

JON W. DUDAS
*Acting Director of the United States Patent and Trademark Office*